United States Patent
Nakagawa et al.

(10) Patent No.: US 7,306,340 B2
(45) Date of Patent: Dec. 11, 2007

(54) PROJECTION SYSTEM USING A HIGH-PRESSURE DISCHARGE LAMP ADAPTED TO D.C. LIGHTING, AND METHOD OF OPERATING THE SAME

(75) Inventors: Atsuji Nakagawa, Himeji (JP); Toshitaka Fujii, Himeji (JP)

(73) Assignee: Phoenix Electric Co., Ltd., Hyogo (JP)

( * ) Notice: Subject to any disclaimer, the term of this patent is extended or adjusted under 35 U.S.C. 154(b) by 114 days.

(21) Appl. No.: 11/116,035

(22) Filed: Apr. 27, 2005

(65) Prior Publication Data
US 2006/0139578 A1    Jun. 29, 2006

(30) Foreign Application Priority Data
Dec. 28, 2004    (JP) .............................. 2004-381820

(51) Int. Cl.
G03B 21/14    (2006.01)
H04N 9/31    (2006.01)

(52) U.S. Cl. .......................... 353/85; 353/84; 353/121; 348/743

(58) Field of Classification Search ................. 353/84, 353/33, 35, 85, 121, 122; 359/887–892; 348/743
See application file for complete search history.

(56) References Cited
U.S. PATENT DOCUMENTS
5,706,061 A * 1/1998 Marshall et al. ............ 348/743
5,917,558 A * 6/1999 Stanton ....................... 348/743
6,803,894 B1 * 10/2004 Hirota et al. ................. 345/88
6,879,451 B1 * 4/2005 Hewlett et al. .............. 359/891

FOREIGN PATENT DOCUMENTS
JP    2004-319193    11/2004

* cited by examiner

Primary Examiner—Andrew T Sever
(74) Attorney, Agent, or Firm—Jordan and Hamburg LLP

(57) ABSTRACT

This invention provides a method of operating a projection system wherein light emitted from a high-pressure discharge lamp being lit with d.c. lamp current is passed through color segments of a color filter sequentially and then reflected by an optical element to project an image on a screen, the color segments of the color filter including red, green and blue color segments and a color segment comprising a green ND filter having a relatively low lightness. The method includes making lower a crest value of the d.c. lamp current fed to the high-pressure discharge lamp for a first illumination period during which the color segment comprising the green ND filter is illuminated than a crest value of the d.c. lamp current fed to the high-pressure discharge lamp for a second illumination period during which any one of the other color segments is illuminated, in synchronism with the first illumination period.

4 Claims, 5 Drawing Sheets

Fig.2
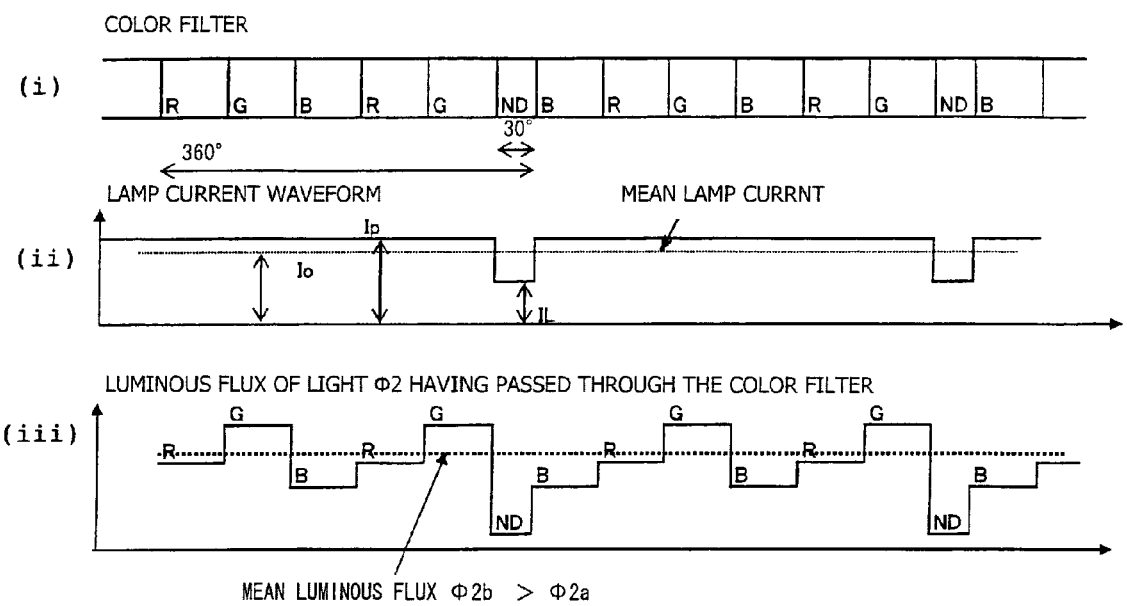
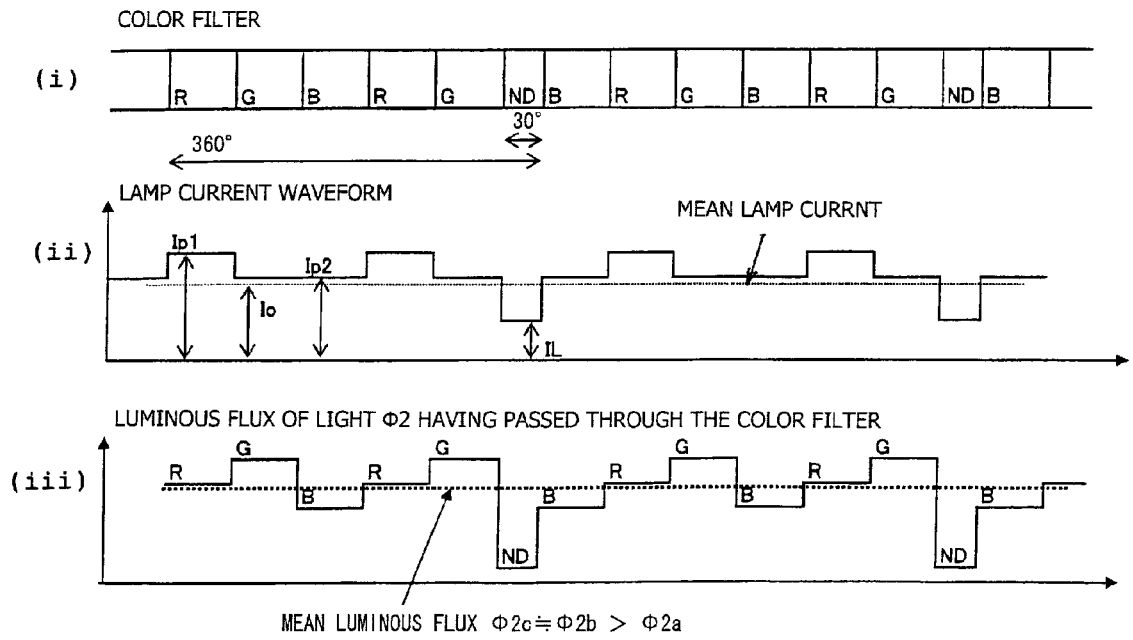

PROJECTION SYSTEM USING A HIGH-PRESSURE DISCHARGE LAMP ADAPTED TO D.C. LIGHTING, AND METHOD OF OPERATING THE SAME

BACKGROUND OF THE INVENTION

1. Field of the Invention

The present invention relates to a projection system incorporating a reflection-type optical element, such as a DMD (Digital Micromirror Device) for example, and an optical element such as a color filter. The invention also relates to a method of operating such a projection system.

2. Description of the Related Art

A common optical element 4 called DMD for use in this type of projection system, particularly home theater or RPTV (Rear Projection Television), includes a six-segment color filter (also called color wheel) 3 having six segments of the three primary colors arranged circumferentially in the sequence of R (red)-G (green)-B (blue)-R-G-B at about 60° intervals, as shown in FIG. 4. Recently, there has been developed a seven-segment color filter including a green ND color filter segment having a relatively low lightness in addition to the above-mentioned six segments, as shown in FIG. 5. The "ND", as used herein, is an acronym for Neutral Density, which means a relatively low lightness.

Reflected light Φ3 from the optical element 4 is imparted with gradation by turning ON/OFF each of micromirrors included in the optical element 4. A halftone of a color is produced by adjustment of the duration of ON state. The six-segment type optical element usually provides gradation based on 8-bit resolving power, whereas the seven-segment type optical element displays each micromirror by, for example, 10-bit driving when a bundle of rays Φ2 having passed through ND filter segment 3g is reflected by the micromirror, thereby improving the reproducibility of a dark portion of an image. As a result, the seven-segment type optical element can realize superior gradation throughout all the levels of gray.

One example of a projection system using such a seven-segment type optical element is HOME THEATER XV-Z1000 manufactured by SHARP CORPORATION. A typical discharge lamp 1 for use in this projection system is adapted to d.c. lighting with d.c. lamp current (Io). The aforementioned ND filter is relatively low in lightness and hence has a low light transmittance. Accordingly, with the discharge lamp 1 driven with lamp current Io, the seven-segment type projection system lessens the luminous flux of light Φ2 having passed through the color filter 3 as compared to the six-segment type projection system, thus resulting in a problem of a lowered screen illuminance. If the ND color filter segment 3g occupies a 30° area, the screen illuminance is lowered by 15-20%. This is because, though the proportion of the area of the ND color filter segment 3g to the entire area of the color filter 3 is 8% (30°/360°=0.08), the ND color filter segment 3g, which is a green area having a high luminous efficiency, contributes to such a large decrease in illuminance.

FIG. 3 shows the waveform of d.c. lamp current driving a conventional d.c. lamp and the waveform of the luminous flux of light Φ2 having passed through the color filter 3. Here, a simple d.c. lighting current F is plotted with a solid line, while a current resulting from superimposition of pulse current IR on the simple current at color filter R (red) for arc stabilization is plotted with a broken line. In FIG. 3, a mean lamp current Io is equal to the simple d.c. lighting current F.

As shown in FIG. 3(iii), the luminous flux of light Φ2 having passed through the color filter 3 varies in accordance with color segments 3a to 3g. Specifically, the luminous flux of light Φ2 having passed through a G (green) color segment having a relatively high luminous efficiency is relatively high, whereas the luminous flux of light Φ2 having passed through a B (blue) color segment having a relatively low luminous efficiency is relatively low. The luminous flux of light Φ2 having passed through an R (red) color segment assumes a value around the midpoint between that of light having passed through the G (green) color segment and that of light having passed through the B (blue) color segment. The luminous flux of light Φ2 having passed through an ND (dark green) color segment assumes the lowest value. The mean luminous flux of light Φ2 is represented by Φ2a in the figure. The ND color filter segment 3g lowers the illuminance of light Φ2 having passed through the color filter 3 largely at mean lamp current Io, which sacrifices the mean luminous flux Φ2a thereby lowering the illuminance of light Φ2 as a while.

Accordingly, it is an object of the present invention to provide a projection system which is configured to lower the value of d.c. lamp current only during an ND filter area illuminating period in terms of the time axis of d.c. lamp current thereby providing the advantages of: (1) further improving the effect of the ND filter on a resulting image; (2) minimizing the decrease in screen illuminance notwithstanding the presence of the ND filter; and (3) improving arc stability.

Another object of the present invention is to provide a method of operating such a projection system.

SUMMARY OF THE INVENTION

In one aspect of the present invention, there is provided a method of operating a projection system wherein light emitted from a high-pressure discharge lamp being lit with d.c. lamp current is passed through color segments of a color filter sequentially and then reflected by an optical element to project an image on a screen, the color segments of the color filter including red, green and blue color segments and a color segment comprising a green ND filter having a relatively low lightness, the method comprising making lower a crest value of the d.c. lamp current fed to the high-pressure discharge lamp for a first illumination period during which the color segment comprising the green ND filter is illuminated than a crest value of the d.c. lamp current fed to the high-pressure discharge lamp for a second illumination period during which any one of the other color segments is illuminated, in synchronism with the first illumination period. The term "ND", as used herein, is an acronym for Neutral Density, which means a relatively low lightness.

On condition that mean lamp current Io is constant throughout one cycle (360°) of the color filter, this method lowers the lamp current fed for the first illumination period, or the ND filter period which has conventionally been responsible for the decrease in screen illuminance, thereby making it possible for the other six color segments to share a lamp output power corresponding to the reduction in the lamp current, hence, minimizing the decrease in screen illuminance. Since the ND filter area 3g has a low light transmittance, decreasing the lamp output power directed to this area 3g makes it possible to improve the reproducibility of a dark portion of a resulting image more effectively. Further, because lowering of lamp current Io to current IL (see FIG. 2) for illuminating the ND filter area 3g is equivalent to superimposition of pulse current on d.c. lamp current, arc stability can be improved without any particular need to superimpose pulse current on d.c. lamp current in illuminating other segments than the ND filter segment 3g. In addition, the waveform of the current fed to the discharge lamp for the second illumination period during which any one of the R, G and B color segments is illuminated is simple and stabilized and, hence, the possibility of gradation disorder can be minimized.

The method of the present invention may further comprise superimposing pulse current on the d.c. lamp current in synchronism with illumination of at least specific one of the red, green and blue color segments. This feature makes it possible to suppress the occurrence of flicker more effectively. By superimposing pulse current on the lamp current during illumination of R (red) color segment 3a for example, the luminous flux of light Φ1 emitted from the discharge lamp is increased and, hence, the luminous flux of light Φ2 having passed through R color segment 3a is increased, whereby an image can be formed with high reproducibility of red, or with red very close to original red.

In another aspect of the present invention, there is provided a projection system comprising: a d.c. high-pressure discharge lamp; a color filter comprising a plurality of color segments including red, green and blue color segments and a color segment comprising a green ND filter having a relatively low lightness; and a d.c. glow starter configured to light the high-pressure discharge lamp by feeding d.c. lamp current thereto, as well as to make lower a crest value of the d.c. lamp current fed for a first illumination period during which the color segment comprising the green ND filter is illuminated than a crest value of the d.c. lamp current fed for a second illumination period during which any one of the other color segments is illuminated, in synchronism with the first illumination period, wherein light emitted from the high-pressure discharge lamp being lit with the d.c. lamp current is passed through the plurality of color segments of the color filter sequentially and then reflected by an optical element to project an image on a screen. This projection system is applicable to the above-described method.

In one embodiment of the projection system, pulse current is superimposed on the d.c. lamp current in synchronism with illumination of at least specific one of the red, green and blue color segments.

According to the present invention, the value of d.c. lamp current is lowered only for the first illumination period during which the ND filter area of the color filter is illuminated in terms of the time axis of d.c. lamp current. By so doing, there are provided the following advantages:

(1) Green of a relatively low lightness is developed through the ND filter of the color filter, whereby the reproducibility of a relatively dark portion of a resulting image is further improved. This will result in excellent expression of gradation throughout all levels of gray.

(2) The screen illuminance can be raised to a level as close as possible to the screen illuminance realized by the six-segment type projection system which does not use the ND filter.

(3) Arc stability within the lamp can be improved to a certain extent, since the waveform of current is equivalent to a pulse current waveform. A further improvement in arc stability can be realized if pulse current is superimposed on the lamp current used to illuminate a specific color segment (red color segment for example.) Since the lamp is adapted to d.c. lighting, pulse current can be used for the specific color segment precisely, which makes it possible to realize an image of stabilized quality free from color gradation disorder.

The foregoing and other objects, features and attendant advantages of the present invention will become more apparent from the reading of the following detailed description of the invention in conjunction with the accompanying drawings.

BRIEF DESCRIPTION OF THE DRAWINGS

FIG. 2 illustrates the waveform of lamp current and the luminous flux of light having passed through a color filter according to the present invention;

DETAILED DESCRIPTION OF THE PREFERRED EMBODIMENTS

Hereinafter, the present invention will be described in detail with reference to embodiments shown in the accompanying drawings.

Figure 1:
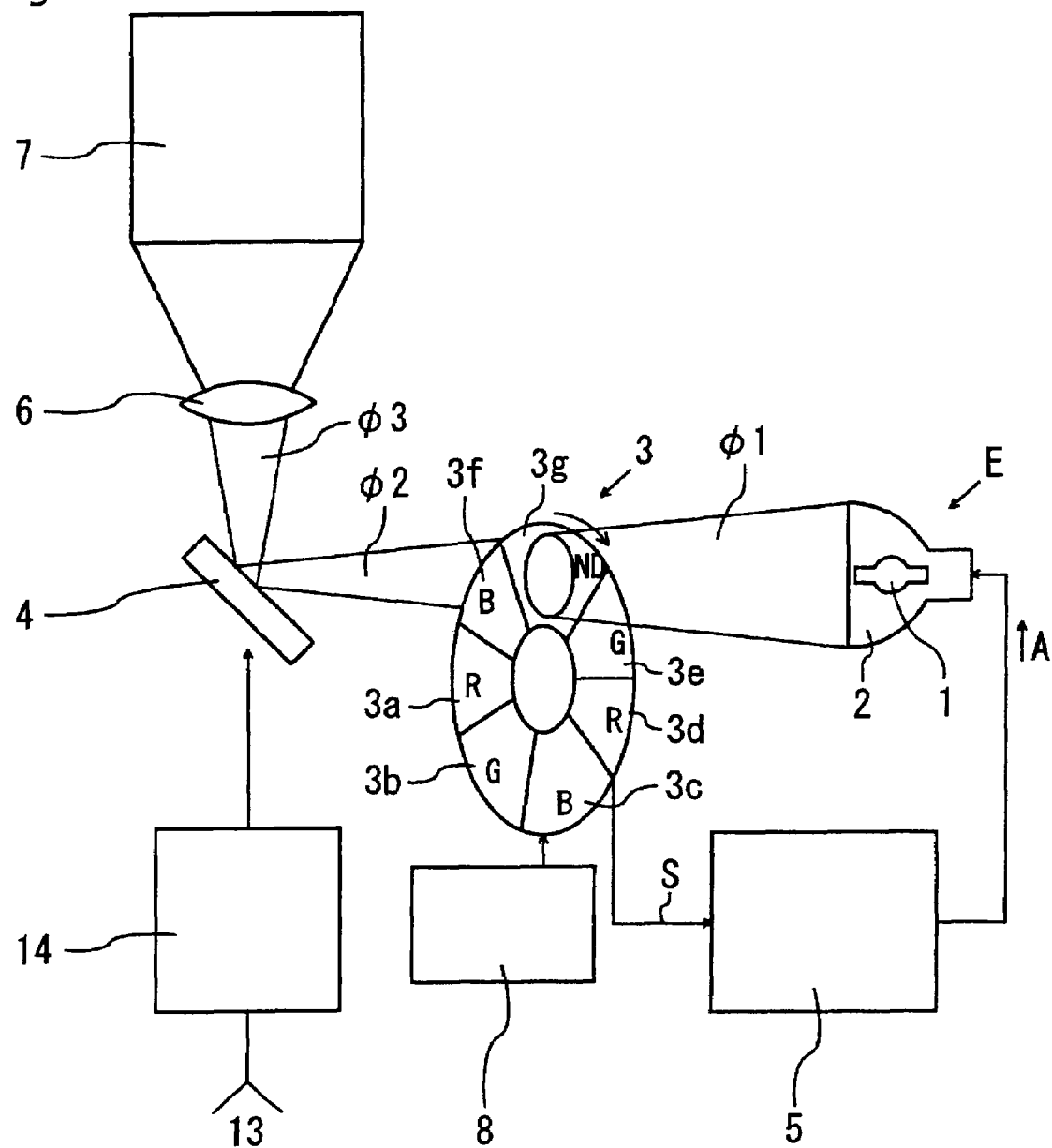
FIG. 1 is a block diagram illustrating the present invention.
Figure 3:
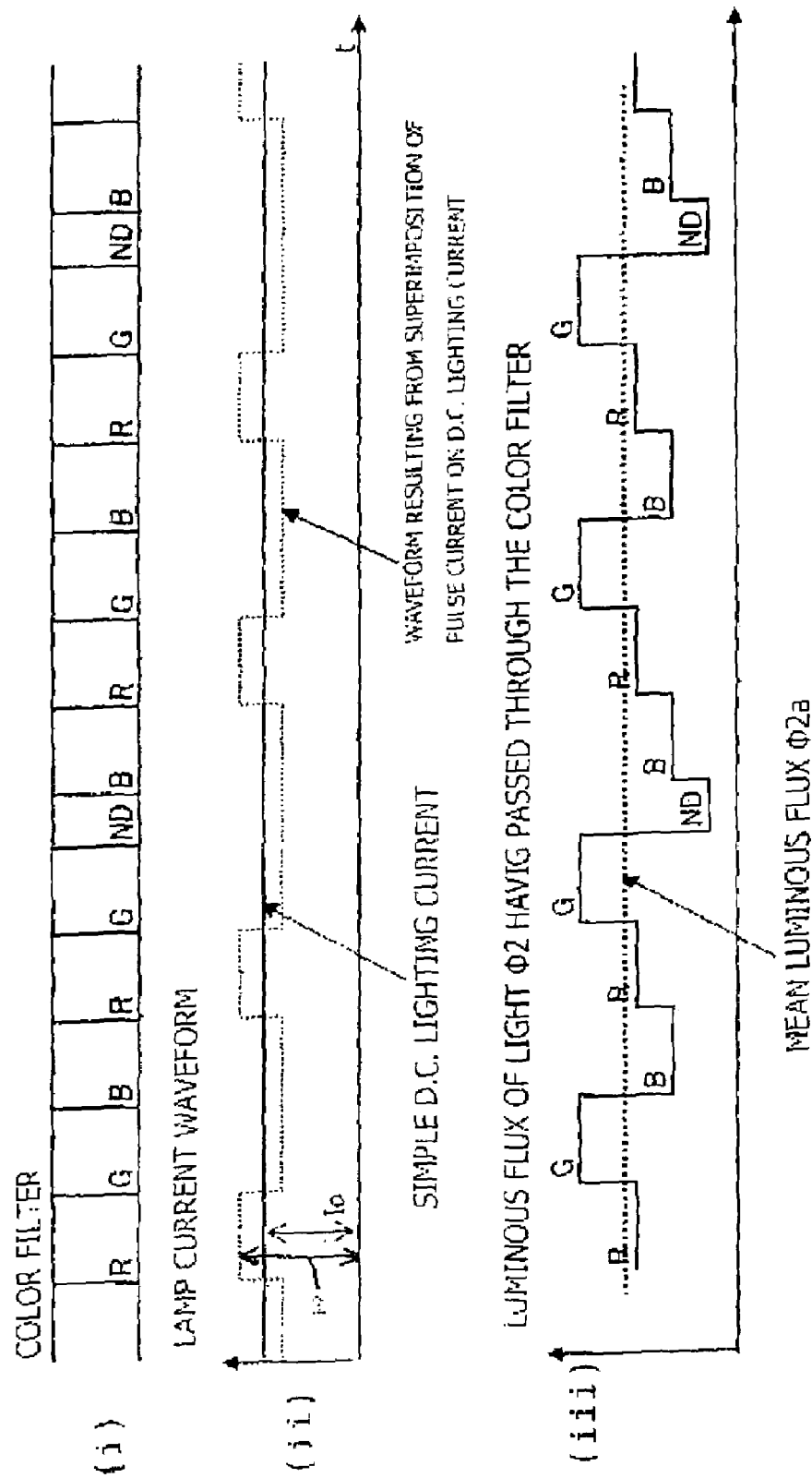
FIG. 3 illustrates the waveform of lamp current and the luminous flux of light having passed through a color filter according to the conventional art.
Figure 4:
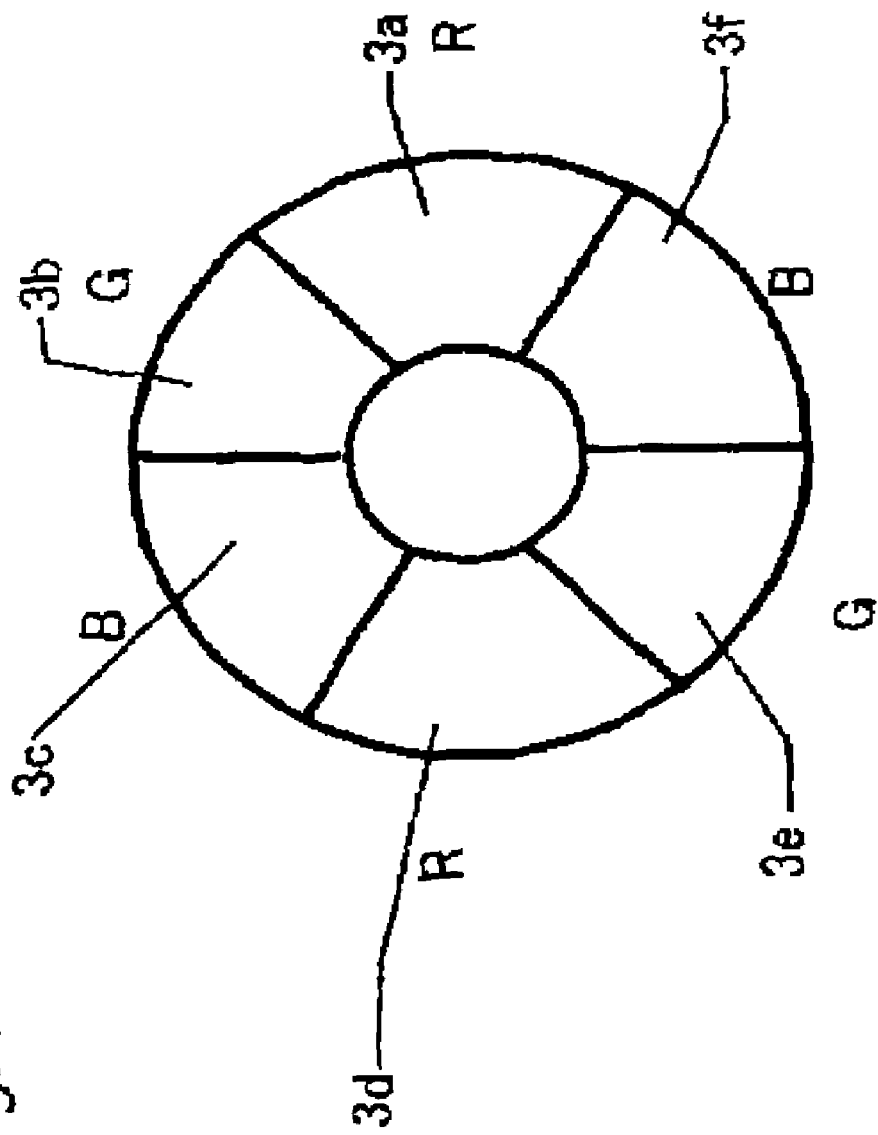
FIG. 4 is a front elevational view of a conventional six-segment type color filter.
Figure 5:
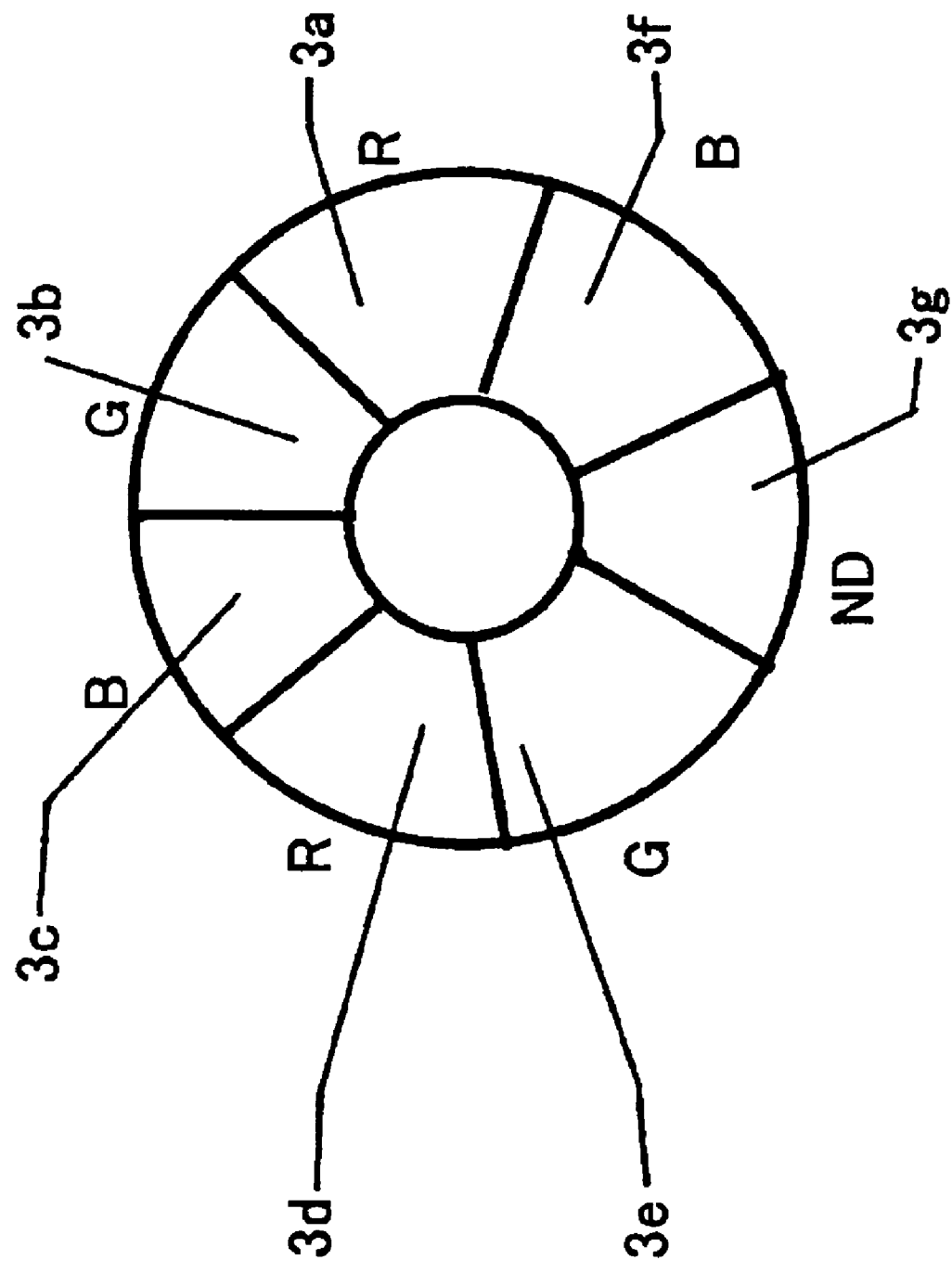
FIG. 5 is a front elevational view of a seven-segment type color filter used in the present invention.

FIG. 1 illustrates a projection system as one embodiment of the present invention. Here, the projection system is configured to project a video picture of 50 Hz for example. However, the present invention is not limited thereto. The projection system uses a high-pressure discharge lamp 1 as a light source E. The high-pressure discharge lamp 1 is fitted on a reflector 2 and is lit with d.c. lamp current fed from a d.c. glow starter 5. Light Φ1 emitted from the high-pressure discharge lamp 1 illuminates a color filter 3 disposed in front of the lamp 1 either directly or by reflection from the reflector 2.

One example of color filter 3 comprises a rotatable disk divided into seven color segments including R (red) color segment 3a, G (green) color segment 3b, B (blue) color segment 3c, R (red) color segment 3d, G (green) color segment 3e, ND (dark green) color segment 3f, and B (blue) color segment 3g, each of which comprises a dichroic filter allowing light having a visible wavelength to pass therethrough selectively. The color filter 3 is rotatable about its axis of rotation and is controlled by a color filter driver 8 so as to rotate at a constant velocity. Where the video frequency is 50 Hz per frame for example (i.e., an image varies 50 times per second within one frame) and the color filter 3 rotates at a velocity three times as high as the speed of this variation, the velocity of rotation of the color filter 3 is 150 Hz. Light Φ1 emitted from the light source E illuminates the color segments 3a to 3g of the color filter 3 rotating at a constant velocity sequentially on a time-sharing basis, with the result that light Φ2 having passed through the color filter 3 becomes colored red, green, blue, . . . corresponding to respective of the color segments sequentially.

Light Φ2 having passed through the color segments 3a to 3g of the color filter 3 is reflected at the surface of an optical element 4 and then passes through a projection lens system 6 to form an image. At that time, reflected light Φ3 from the optical element 4 is modulated based on video information transferred to the optical element 4 from an optical element driver 14 receiving video information from a video input section 13.

FIG. 2(*a*) shows the waveform of d.c. lamp current which is lowered for an illumination period during which the color segment 3*g* comprising ND filter is illuminated and the waveform of luminous flux of light Φ2 having passed through the color filter 3. A synchronizing signal S from the color filter 3 is inputted to the d.c. glow starter 5. In synchronism with the synchronizing signal the crest value of d.c. lamp current is lowered from Ip to IL for the illumination period during which the ND filter (color segment 3*g*) is illuminated (hereinafter will be referred to as "ND illumination period" as the case may be.) Since the lamp current is lowered for the ND illumination period, the luminous flux of light Φ1 is also lowered for the ND illumination period. For this reason, the lightness or luminous flux of light Φ2 having passed through the ND filter color segment 3*g* is lowered accordingly, which realizes effective dark green reproduction. The mean value Io of lamp current in the present invention is equal to the mean value of lamp current in the conventional art. For illumination periods over which R, G and B color segments are illuminated, the lamp current can be increased by a rise corresponding to the decrease in the lamp current caused during the ND illumination period. Accordingly, the lamp current assumes a value Ip, which is more than Io (Ip>Io), over the R, G and B illumination periods. If the ND illumination period corresponds to 30° for example, then $$(Io-IL) \times 30° = (Ip-Io) \times (360° - 30°)$$

It follows that Ip=(360°/330°)(Io)−(30°/330°)(IL). Put IL= (1/2) (Io): then $$(Ip) = (345°/330°)(Io) \approx 1.05 \times (Io.)$$

Thus, lamp current Ip fed over the R, G and B illumination periods can be about 5% higher than in the conventional art. As a result, the luminous flux of light Φ2 having passed through any one of the G, B and R color segments of the color filter 3 is higher than in the conventional art, as shown in FIG. 2(*a-ii*.) In contrast, the luminous flux of light Φ2 having passed through the ND filter color segment 3*g* is lower than in the conventional art. The mean luminous flux of light Φ2 obtained in this case is represented by Φ2*b* in FIG. 2(*a-iii*.) According to the above-noted calculation, the luminous flux Φ2*b* obtained in the present invention is about 5% higher in lamp current ratio and about 10% higher in luminous flux ratio than the luminous flux Φ2*a* obtained in the conventional art.

The lamp current waveform shown in FIG. 2(*a-ii*) is equivalent to a waveform resulting from superimposition of pulse current having a heavy duty on d.c. lamp current. This contributes to an improvement in arc stability. This advantage will be described briefly.

With respect to the electric power of pulse current to be superimposed on d.c. lamp current, the occurrence of arc jump can be suppressed remarkably and quickly by feeding the high-pressure discharge lamp 1 with a relatively low pulse superimposing power as low as 1% or more of the rated power of the high-pressure discharge lamp 1. Stated otherwise, arc can be stabilized. Although the mechanism of this effect is not necessarily clear, it seems that the temperature of a current arc spot from which the generation of arc is started is raised periodically by the pulse superimposing power, which betters electron emission from the current arc spot before the arc spot shifts from the current arc spot to another arc spot thereby improving the arc stability. It has been found from the results of experiments that the occurrence of flicker due to arc jump can be satisfactorily suppressed as long as the pulse superimposing power to be fed to the high-pressure discharge lamp 1 is 1% of the rated power of the high-pressure discharge lamp 1. The pulse superimposing power is preferably in the range from 2% to 7% of the rated power. In this case the occurrence of flicker can be prevented substantially completely. The upper limited of the pulse superimposing power is 20% of the rated power. If the pulse superimposing power is more than 20% of the rated power, the pulse superimposing power is excessive relative to the rated power and, hence, lighting is not based on d.c. current any more but is chiefly based on pulse current. In this way, according to the present invention, the arc stability can be improved by using a relatively feeble pulse current and, hence, a projection system constructed using a DMD exhibits less influence on gradation.

FIG. 2(*b*) shows waveforms according to another embodiment. These waveforms include the waveform of d.c. lamp current which is lowered for an illumination period during which the color segment 3*g* comprising ND filter is illuminated while being superimposed with pulse current (having a crest value Ip1) for an illumination period during which R (red) segment 3*a* is illuminated and the waveform of luminous flux of light Φ2 having passed through the color filter 3. In FIG. 2(*b*), Ip2 represents the value of lamp current fed over illumination periods during which G (green) and B (blue) segments are illuminated.

A synchronizing signal S from the color filter 3 is inputted to the d.c. glow starter 5. In synchronism with the synchronizing signal S the crest value of d.c. lamp current is lowered from Ip2 to IL for the ND illumination period, while pulse current is superimposed on the d.c. lamp current for the illumination period during which R segment 3*a* is illuminated.

Since the lamp current is lowered for the ND illumination period, the luminous flux of light Φ1 incident on the ND filter is also lowered for the ND illumination period, as in the case of FIG. 2(*a*.) For this reason, the lightness or luminous flux of light having passed through the ND filter color segment 3*g* is lowered accordingly, which realizes effective dark green reproduction. On condition that the mean value Io of lamp current in the present invention is equal to the mean value of lamp current in the conventional art as in the former embodiment, the lamp current assumes a value Ip1, which is larger than Io (Ip1>Io) as in the former embodiment, for the R segment illumination period. The luminous flux of light Φ2 having passed through the R segment 3*a* increases proportionally to the value Ip1. On the other hand, the lamp current assumes a value Ip2 over the G and B segments illumination periods. If the increase in lamp current during the R segment illumination period is equal to the decrease in lamp current during the ND illumination period, Ip2 is equal to Io, or Ip2=Io. If the increase in lamp current during the R segment illumination period is smaller than the decrease in lamp current during the ND illumination period, Ip2 is larger than Io, or Ip2>Io.

As a result, the luminous flux of light Φ2 having passed through the color filter 3 becomes highest at red segment 3*a* because of lamp current Ip1 while assuming a value equal to or higher than mean lamp current Io at the G and B segments 3*b* and 3*c* because of the relationship between lamp current IL for the ND segment 3*g* and lamp current Ip1 for red segment 3*a*, as shown in FIG. 2(*b-ii*). That is, red light has a relatively high luminous flux as compared with the case of FIG. 2(*a*), while ND (dark green) light has the lowest luminous flux. In FIG. 2(*b*), Φ2*c* represents the mean value of luminous flux of light Φ2. The luminous flux Φ2*c* is substantially equal to the luminous flux Φ2*b* and hence is about 5% higher in lamp current ratio and about 10% higher in luminous flux ratio than the luminous flux Φ2*a* obtained in the conventional art as in the embodiment shown in FIG. 2(*a*.) Further, the occurrence of flicker due to arc jump can be suppressed more effectively by superimposition of pulse current on lamp current. Moreover, by superimposition of pulse current on lamp current used to generate red light for example, an image with high reproducibility of red, or with red very close to original red.

As has been described above, notwithstanding the use of the seven-segment color filter, the present invention makes it possible to attain a illuminance level very close to the illuminance obtained by the conventional art using the six-segment color filter not provided with the ND filter without increasing the amount of current per cycle. Thus, the present invention can contribute to evolution of image quality provided by image systems or optical systems such as a projector and a rear projection television set.

The foregoing embodiments are illustrative in all points and should not be construed to limit the present invention. The scope of the present invention is defined not by the foregoing embodiment but by the following claims. Further, the scope of the present invention is intended to include all modifications within the meanings and scopes of claims and equivalents.

What is claimed is:

1. A method of operating a projection system wherein light emitted from a high-pressure discharge lamp being lit with d.c. lamp current is passed through color segments of a color filter sequentially and then reflected by an optical element to project an image on a screen, the color segments of the color filter including red, green and blue color segments and a color segment comprising a green ND filter having a relatively low lightness, the method comprising making lower a crest value of the d.c. lamp current fed to the high-pressure discharge lamp for a first illumination period during which the color segment comprising the green ND filter is illuminated than a crest value of the d.c. lamp current fed to the high-pressure discharge lamp for a second illumination period during which the other color segments are illuminated, in synchronism with the first illumination period.

2. The method according to claim 1, further comprising superimposing pulse current on the d.c. lamp current in synchronism with illumination of at least specific one of the red, green and blue color segments.

3. A projection system comprising: a d.c. high-pressure discharge lamp; a color filter comprising a plurality of color segments including red, green and blue color segments and a color segment comprising a green ND filter having a relatively low lightness; and a d.c. glow starter configured to light the high-pressure discharge lamp by feeding d.c. lamp current thereto, as well as to make lower a crest value of the d.c. lamp current fed for a first illumination period during which the color segment comprising the green ND filter is illuminated than a crest value of the d.c. lamp current fed for a second illumination period during which the other color segments are illuminated, in synchronism with the first illumination period, wherein light emitted from the high-pressure discharge lamp being lit with the d.c. lamp current is passed through the plurality of color segments of the color filter sequentially and then reflected by an optical element to project an image on a screen.

4. The projection system according to claim 3, wherein pulse current is superimposed on the d.c. lamp current in synchronism with illumination of at least specific one of the red, green and blue color segments.

* * * * *